US011147117B2

(12) United States Patent
Charbit et al.

(10) Patent No.: US 11,147,117 B2
(45) Date of Patent: Oct. 12, 2021

(54) TIMING ADVANCE VALIDATION FOR TRANSMISSION IN PRECONFIGURED UPLINK RESOURCES IN NB-IOT

(71) Applicant: MediaTek Singapore Pte. Ltd., Singapore (SG)

(72) Inventors: Gilles Charbit, Hampshire (GB); Shiang-Jiun Lin, Hsinchu (TW); Per Johan Mikael Johansson, Kungsangen (SE)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/586,255

(22) Filed: Sep. 27, 2019

(65) Prior Publication Data

US 2020/0107389 A1 Apr. 2, 2020

Related U.S. Application Data

(60) Provisional application No. 62/737,971, filed on Sep. 28, 2018.

(51) Int. Cl.
*H04W 76/27* (2018.01)
*H04L 12/24* (2006.01)
(Continued)

(52) U.S. Cl.
CPC ......... *H04W 76/27* (2018.02); *H04L 41/0806* (2013.01); *H04L 67/12* (2013.01); *H04W 72/0446* (2013.01); *H04W 74/0833* (2013.01)

(58) Field of Classification Search
CPC ............. H04W 76/27; H04W 72/0446; H04W 74/0833
See application file for complete search history.

(56) References Cited

U.S. PATENT DOCUMENTS

2014/0064195 A1   3/2014  Li et al.
2014/0092812 A1*  4/2014  Jang .................. H04W 74/0833
                                                    370/328
(Continued)

FOREIGN PATENT DOCUMENTS

CN    107710810 A   2/2018
CN    108337728 A   7/2018
(Continued)

OTHER PUBLICATIONS

Hoglund, A. et al, "3GPP Release 15 Early Data Transmission," IEEE Communications Standards Magazine, vol. 2, issue 2, Jun. 2018, pp. 90-96. (Year: 2018).*

(Continued)

*Primary Examiner* — Donald L Mills
(74) *Attorney, Agent, or Firm* — Han IP PLLC; Andy M. Han (57) ABSTRACT

Various examples and schemes pertaining to timing advance validation for transmission in preconfigured uplink resources in narrowband Internet of Things (NB-IoT) are described. When in a first mode, an apparatus (e.g., a user equipment) receives a plurality of different values for a time alignment timer (TAT) from a network before entering a second mode from the first mode. When in the second mode, the apparatus selects one of the plurality of values to apply to the TAT and also starts the TAT to count. When there is data for uplink transmission while the apparatus is still in the second mode, the apparatus performs an early data transmission in an event that a timing advance (TA) value is valid and that the apparatus is in the same serving cell as it was before entering the second mode.

20 Claims, 4 Drawing Sheets

(51) Int. Cl.
*H04L 29/08* (2006.01)
*H04W 72/04* (2009.01)
*H04W 74/08* (2009.01)

(56) References Cited

U.S. PATENT DOCUMENTS

| | | |
|---|---|---|
| 2017/0006599 A1 | 1/2017 | Dinan |
| 2017/0150391 A1 | 5/2017 | Bergquist et al. |
| 2019/0104470 A1* | 4/2019 | Johansson ........... H04W 72/121 |
| 2019/0289660 A1* | 9/2019 | Yi ........................ H04W 76/27 |

FOREIGN PATENT DOCUMENTS

| | | |
|---|---|---|
| EP | 2640138 A1 | 9/2013 |
| WO | WO 2013013385 A1 | 1/2013 |
| WO | WO 2016124811 A1 | 8/2016 |

OTHER PUBLICATIONS

Taiwan Intellectual Property Office, Office Action for Taiwan Patent Application No. 108135289, dated Sep. 29, 2020.
China National Intellectual Property Administration, International Search Report and Written Opinion for PCT/CN2019/108864, dated Dec. 30, 2019.
3GPP, Technical Specification 36.523-3 V15.0.0, Jun. 2018.
China Nati Intellectual Property Administration, Office Action for China Patent Application No. 201980003741.6, dated Jul. 29, 2021.

\* cited by examiner

TIMING ADVANCE VALIDATION FOR TRANSMISSION IN PRECONFIGURED UPLINK RESOURCES IN NB-IOT

CROSS REFERENCE TO RELATED PATENT APPLICATION(S)

The present disclosure is part of a non-provisional application claiming the priority benefit of U.S. Patent Application No. 62/737,971, filed on 28 Sep. 2018, the content of which being incorporated by reference in its entirety.

TECHNICAL FIELD

The present disclosure is generally related to narrowband Internet of Things (NB-IoT) and, more particularly, to timing advance validation for transmission in preconfigured uplink resources in NB-IoT.

BACKGROUND

Unless otherwise indicated herein, approaches described in this section are not prior art to the claims listed below and are not admitted as prior art by inclusion in this section.

In general, under the 3$^{rd}$ Generation Partnership Project (3GPP) specifications, timing advance is a medium access control (MAC) control element (CE) that is used to control uplink signal transmission timing. Specifically, a network keeps measuring the time difference between reception of uplink transmissions from a user equipment (UE), such as physical uplink shared channel (PUSCH), physical uplink control channel (PUCCH) and sounding reference signal (SRS), and the subframe time, then the network sends a timing advance command to the UE to change its uplink transmission timing so that uplink transmissions from the UE can be better aligned with the subframe timing on the network side.

Moreover, under the 3GPP specifications, an uplink (UL) timing alignment maintenance procedure is utilized to ensure that a UE stays synchronized with the network on UL transmissions. The UE maintains UL timing alignment based on a timing advance (TA) command received from the network and TA value(s) contained in the TA command. However, the existing UL timing alignment maintenance procedure applies to connected UEs and UEs switching to the connected mode. In an event that an idle UE needs to transmit data early, there needs to be a way to allow the idle UE to be able to maintain UL timing alignment.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus, in a first mode, receiving a plurality of different values for a time alignment timer (TAT) from a network before entering a second mode from the first mode. When the apparatus is in the second mode, the method may involve the processor performing certain operations. For instance, the method may involve the processor selecting one of the plurality of values to apply to the TAT. Additionally, the method may involve the processor starting the TAT to count.

In one aspect, an apparatus may include a communication device and a processor coupled to the communication device. The communication device may be configured to wirelessly communicate with a network. The processor may be configured to receive, via the communication device when the apparatus is in a first mode, a plurality of different values for a TAT from the network before entering a second mode from the first mode. When the apparatus is in the second mode, the processor may be configured to perform certain operations. For instance, the processor may select one of the plurality of values to apply to the TAT. Moreover, the processor may start the TAT to count.

It is noteworthy that, although description provided herein may be in the context of certain radio access technologies, networks and network topologies such as IoT and NB-IoT, the proposed concepts, schemes and any variation(s)/derivative(s) thereof may be implemented in, for and by other types of radio access technologies, networks and network topologies such as, for example and without limitation, 5$^{th}$ Generation (5G), New Radio (NR), Long-Term Evolution (LTE), LTE-Advanced, LTE-Advanced Pro and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to timing advance validation for transmission in preconfigured uplink resources in NB-IoT. According to the present disclosure, a number of possible solutions may be implemented separately or jointly. That is, although these possible solutions may be described below separately, two or more of these possible solutions may be implemented in one combination or another.

Figure 1:
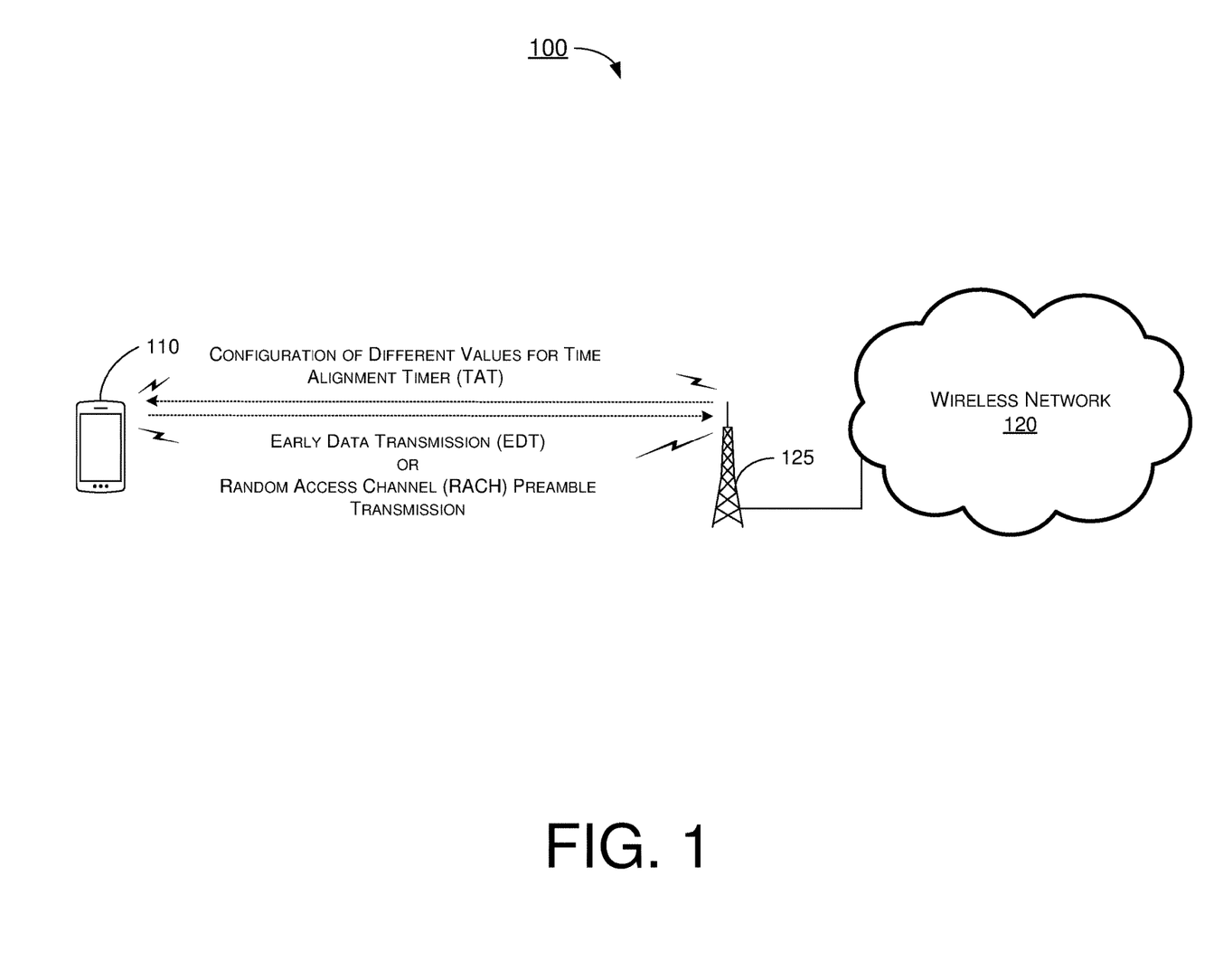
FIG. 1 is a diagram of an example network environment in which various solutions and schemes in accordance with the present disclosure may be implemented.
Figure 2:
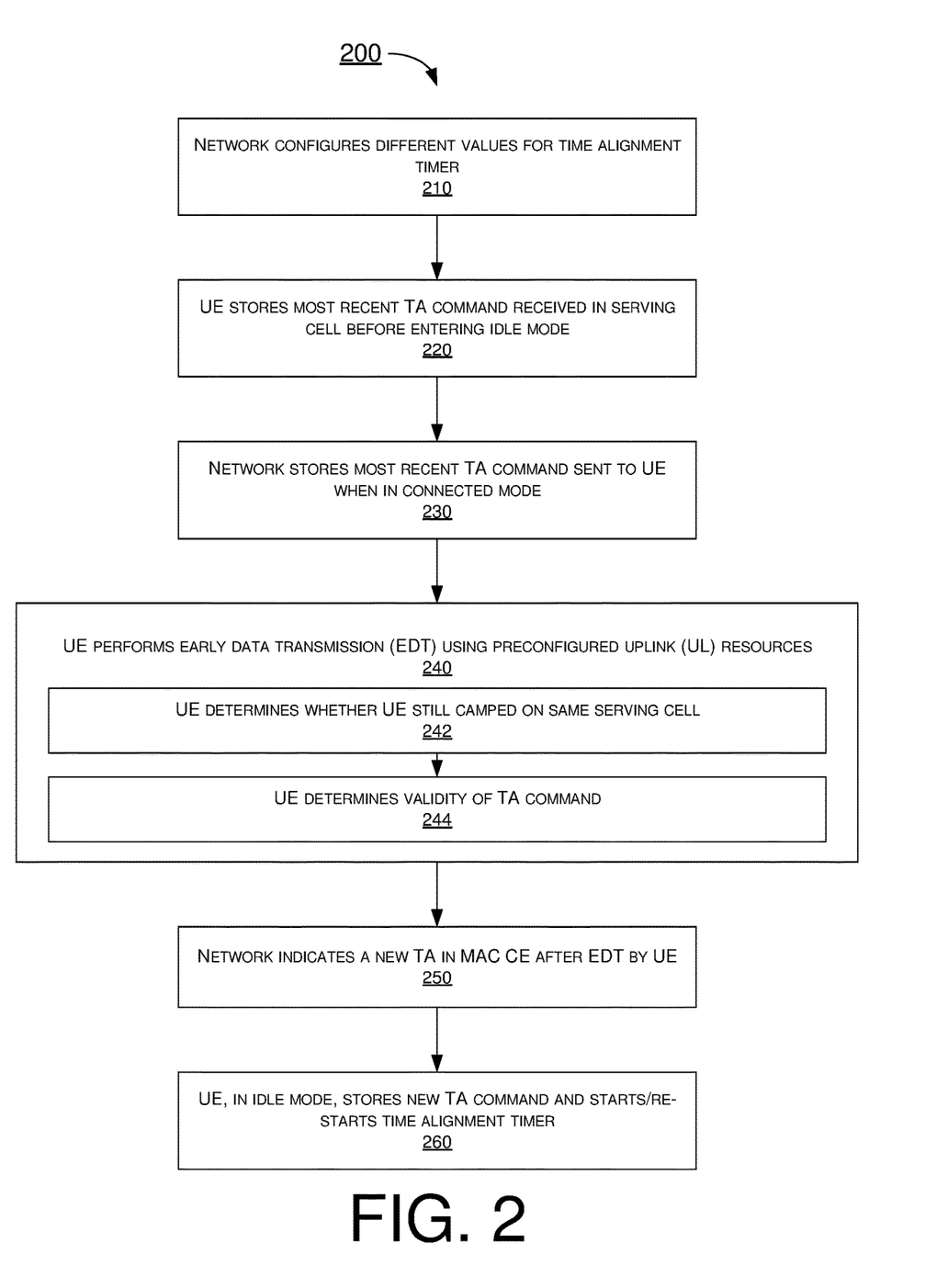
FIG. 2 is a diagram of an example procedure of an extension of an uplink timing alignment maintenance procedure in accordance with the present disclosure.

FIG. 1 illustrates an example network environment 100 in which various solutions and schemes in accordance with the present disclosure may be implemented. FIG. 2 illustrates an example procedure 200 of an extension of an uplink timing alignment maintenance procedure in accordance with the present disclosure. Procedure 200 may be implemented in network environment 100. The following description of various proposed schemes is provided with reference to FIG. 1 and FIG. 2.

Referring to FIG. 1, network environment 100 may involve a UE 110 in wireless communication with a wireless network 120 (e.g., an NB-IoT network or a 5G NR mobile network) via a base station 125 (e.g., an eNB, a gNB or a transmit-receive point (TRP)). In network environment 100, UE 110 and wireless network 120 may implement various schemes pertaining to timing advance validation for transmission in preconfigured uplink resources in NB-IoT in accordance with the present disclosure. For instance, wireless network 120 may configure a plurality of different values for a time alignment timer (TAT) at UE 110, and UE 110 may, depending on a result of timing advance (TA) validation, perform an early data transmission (EDT) or a random access channel (RACH) preamble transmission. The follow description of various solutions and schemes in accordance with the present disclosure is provided with reference to FIG. 1.

In network environment 100, UE 110 may be in a radio resource control (RRC) connected mode, an RRC idle mode or an RRC suspend mode. When in the RRC connected mode, network 120 may configure a plurality of different values for a time alignment timer (TAT) at UE 110 for timing alignment by signaling a configuration to UE 110 via base station 125. Timing alignment may extend timing advance (TA) value(s) used by UE 110 in the RRC connected mode, as well as an uplink (UL) timing alignment procedure, to the RRC idle mode. Network 120 may configure the different values for TAT based on a coverage class and/or subscription-based UE differentiation information.

When in the RRC idle mode and before switching back to the RRC connected mode, UE 110 may determine that there is data available at UE 110 for UL transmission to network 120. Accordingly, UE 110 may perform an EDT or a RACH preamble transmission, depending on a result of TA validation.

Regarding EDT, a procedure for EDT in Message 3 in a random access procedure and UL semi-persistent scheduling for connected UEs is specified in Release 15 of the 3GPP specification. An extension of EDT in Message 3 entails skipping Message 1 and Message 2 in the EDT random access procedure, where a UE (e.g., UE 110) would directly transmit data in Message 3 using preconfigured UL resources in RRC idle mode. On the other hand, in an RRC connection suspend procedure, the network (e.g., network 120) would indicate to the UE context in S1-AP UE Context Suspend Request. The UE (e.g., UE 110) would store the UE AS context and enters the RRC idle mode. In EDT procedure for User Plane cellular internet of things (CIoT) evolved packet system (EPS) optimization, the network can recover the UE context in S1-AP.

Generally speaking, at any given time, there may be many idle UEs within a tracking area. A base station (e.g., base station 125) within the tracking area may not know about idle UEs camping on its cell. UE context can include subscription-based UE differentiation information indicating whether a UE is stationary or mobile, how the UE may transmit data (e.g., periodically, scheduled (such as day of the week, beginning and end of day), traffic profile (such as single, multiple packets)), battery powered or not. If supported, the base station needs to store the subscription-based UE differentiation information indicated in the UE context as this may be necessary to prepare the X2 messages.

Under a proposed scheme in accordance with the present disclosure, a base station (e.g., base station 125) may use stored UE context to configure shared or dedicated preconfigured UL resources for EDT by a UE (e.g., UE 110). The use of dedicated resources (e.g., narrowband physical uplink shared channel (NPUSCH)) for EDT may be suitable for fixed devices such as smart meters that typically transmit at regular times of the day with some periodicity. The network may also assume that such fixed devices transmit at fixed configured times. That is, traffic model for such fixed devices may be predictable. In contrast, the use of shared resources (e.g., NPUSCH) for EDT may be suitable for fixed devices such as sensors with transmissions that cannot be predicted and can occur at irregular timers (e.g., requiring immediate transmission on detecting abnormal conditions).

With respect to UL transmission using preconfigured UL resources while in RRC idle mode, it has been agreed in 3GPP that UL transmission in idle mode using preconfigured UL resources is supported for UEs in possession of a valid TA. That is, for transmission in preconfigured UL resources, the UE may use the latest TA of which its validity can be confirmed. Accordingly, an UL timing alignment maintenance procedure ensures that the UE (e.g., UE 110) stays synchronized with the network (e.g., network 120 via base station 125) on the UL transmission. The UE may maintain UL timing alignment based on a TA command received from the network as well as the TAT. There may be several cases, including: initial access, narrowband physical downlink control channel (NPDCCH) order, scheduling request, and timing advance update.

In the case of initial access, network 120 may indicate a TA command in a contentious random access response (RAR) during a RACH procedure when UE 110 is switching from the RRC idle mode to the RRC connected mode. UE 110 may store the initial TA and start the TAT counting. In the case of NPDCCH order, network 120 may send an NPDCCH order to UE 110 to trigger a non-contentious random access procedure by UE 110 in the RRC connected mode. UE 110 may transmit a preamble and receive a TA command from network 120 in RAR. UE 110 may store a new TA value indicated in the TA command and start (or restart) the TAT counting. In the case of scheduling request, network 120 may indicate a TA command in an RAR in a contentious random access procedure. The connected UE 110 may need to request UL resources but does not have configured NPUSCH resources for scheduling request. UE 110 may store a new TA value indicated in the TA command and start (or restart) the TAT counting. In the cast of timing advance update, when a TA command MAC CE is received from network 120 and in an event that a TA has been stored or maintained, UE 110 may apply the TA command and start (or restart) the TAT counting.

In each case, the information element (IE) TimeAlignmentTimer (TAT) may be utilized to control how long UE 110 considers the serving cell to be uplink time aligned or how long UE 110 considers the serving cells belonging to the associated tracking area group (TAG) to be uplink time aligned. The value of TAT may be denoted in numbers of subframes. For example, the value sf500 denotes 500 subframes and the value sf750 denotes 750 subframes. The TAT may be configured through timeAlignmentTimerCommon (which is common for all UEs in a cell and included in a System Information Block (SIB) such as SIB Type 2 (SIB2)) or timeAlignmentTimerDedicated (which is UE-specific and included in the RRC Connection Reconfiguration Message).

The UL timing alignment maintenance procedure outlined above may be applicable to connected UEs or idle UEs switching to the RRC connected mode. In case that UE 110 in the RRC idle mode needs to transmit data early, it may be necessary to extend the UL timing alignment maintenance procedure to UE 110 as an idle UE.

Referring to FIG. 2, procedure 200 as an extension of an uplink timing alignment maintenance procedure in accordance with the present disclosure may involve a number of operations and/or actions performed by an idle UE (e.g., UE 110), as represented by one or more of blocks 210, 220, 230, 240, 250 and 260. Although illustrated as discrete blocks, various blocks of procedure 200 of an uplink timing alignment maintenance procedure may be divided into additional blocks, combined into fewer blocks, or eliminated, depending on the desired implementation. Procedure 200 may begin at 210.

At 210, procedure 200 may involve network 120 configuring a plurality of different values for the IE TimeAlignmentTimer in UE 110. For instance, network 120 may configure different values for TimeAlignmentTimerwith a cell-specific timeAlignmentTimerCommon indicated in a SIB2 (e.g., SystemInformationBlockType2-NB). Alternatively, network 120 may configure different values for TimeAlignmentTimer with a dedicated timeAlignmentTimerDedicated. Thus, the TAT in UE 110 (e.g., timeAlignmentTimer) may have a value indicated in the IE TimeAlignmentTimer={sf500, sf750, sf1280, sf1920, sf2560, sf5120, sf10240, infinity}. Procedure 200 may proceed from 210 to 220.

At 220, procedure 200 may involve UE 110, in the RRC connected mode, storing the most recent TA command (and hence the most recent TA value(s) indicated in that TA command) received in the serving cell before UE 110 enters the RRC idle mode from the RRC connected mode. Procedure 200 may proceed from 220 to 230.

At 230, procedure 200 may involve network 120 storing the most recent TA command transmitted, via base station 125, to UE 110 when UE 110 was still in the RRC connected mode. Procedure 200 may proceed from 230 to 240.

At 240, procedure 200 may involve UE 110, while in the RRC idle mode, performing EDT using preconfigured UL resources (e.g., when UE 110 determines that there is data available for UL transmission to network 120). Before performing the EDT, procedure 200 may involve UE 110 performing certain operations, as represented by 242 and 244. For instance, at 242, procedure 200 may involve UE 110 determining whether at this moment UE 110 is still camped on the same serving cell as that which UE 110 was camped on (and from which UE 110 received the last TA command) before entering the RRC idle mode. Moreover, at 244, procedure 200 may involve UE 110 determining whether the last TA command received is still valid with respect to expiry of the TAT. That is, in an event that the TAT has not expired, UE 110 may consider the TA command (and the TA value contained therein) to be valid; otherwise, in an event that the TAT has expired, UE 110 may consider the TA command (and the TA value contained therein) to be invalid. Procedure 200 may proceed from 240 to 250.

At 250, procedure 200 may involve network 120 indicating a new TA command to UE 110, by signaling a MAC CE to UE 110 via base station 125, following the EDT by UE 110 using preconfigured UL resources. Procedure 200 may proceed from 250 to 260.

At 260, procedure 250 may involve UE 110, in the RRC idle mode, storing the new TA command and starting (or restarting) the TAT.

Under a proposed scheme in accordance with the present disclosure, in extending the UL timing alignment maintenance procedure, the TA value may be kept by UE 110 and the TAT may keep counting when UE 110 leaves the RRC connected mode and enters the RRC idle mode or the RRC suspend mode. Moreover, under the proposed scheme, there may be some new signaling or idle UE behaviors with respect to procedure 200, as described below.

At 210 of procedure 200, in an event that network 120 is aware of which UE(s) among a plurality of UEs (not shown) is/are stationary (e.g., based on subscription-based UE differentiation information in UE context), network 120 may configure different values for the timeAlignmentTimer based on coverage class and/or subscription-based UE differentiation information. For example, for stationary devices such as smart meters, the value timeAlignmentTimer may be set to infinity as configured in SIB2-NB. Similarly, for pseudo-fixed devices such as bicycles, a first value timeAlignmentTimer1 may be set to infinity indicated in SIB2-NB (e.g., when the bicycle is in a bike rack) or a second value timeAlignmentTimer2 may be set to sf2560 or sf5120 (e.g., when the bicycle is moving) as configured via RRC signaling.

At 242 of procedure 200, for UE 110 in the RRC idle mode, having a valid TA commend (and corresponding TA value) may imply that UE 110 is still camped on the same cell from which UE 110 received the last TA command (e.g., UE 110 has not moved significantly within the cell). Such condition may be easily met by stationary devices. In case that network 120 is aware of which devices are stationary (e.g., based on stored subscription-based UE differentiation information in UE context), network 120 may assume that such stationary devices will stay in the same cell and will not need to move to the RRC connected mode to initiate UL timing alignment procedure.

At 244 of procedure 200, UE 110 in the RRC idle mode may check the last TA command received from network 120 for its validity until the expiry of one or several timeAlignmentTimer timers (e.g., TATs running on different TA values).

At 250 and 260 of procedure 200, the acknowledgement (ACK) and negative acknowledgement (NACK) for hybrid automatic repeat request (HARQ) with respect to EDT by UE 110 in the RRC idle mode, if supported, may include a new TA command. This may be done via (i) a new field in downlink control information (DCI) or (ii) MAC CE on an associated NPDSCH. The TA command may comprise 11 bits and may be transmitted before the timeAlignmentTimer expires. The use of MAC CE may be preferable so as to avoid performance issue due to DCI encoded with higher effective code rate.

It is noteworthy that the TA command may not be provided by network 120 to UE 110 in a RAR message when UE 110 does not send a RACH preamble. On receiving an UL packet on preconfigured UL resources, base station 125 may determine a new TA based on the timing of the detection of the associated demodulation reference signal (DMRS) sequence and, correspondingly, base station 125 may indicate such via a MAC CE if necessary (e.g., in an event that a new TA command is different from the most recent TA command previously transmitted to UE 110).

Illustrative Implementations

Figure 3:
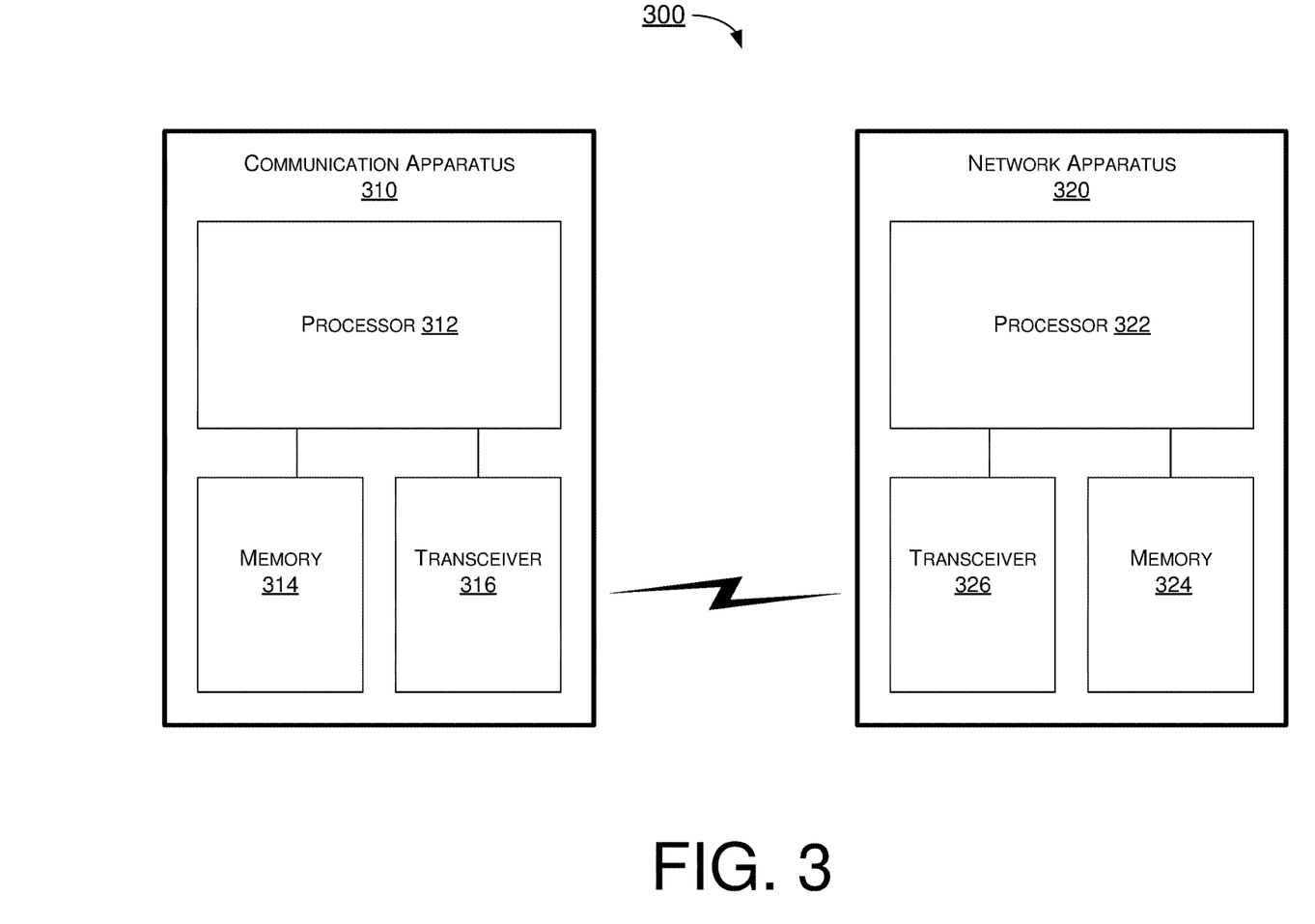
FIG. 3 is a block diagram of an example communication apparatus and an example network apparatus in accordance with an implementation of the present disclosure.

FIG. 3 illustrates an example communication environment 300 having an example apparatus 310 and an example apparatus 320 in accordance with an implementation of the present disclosure. Each of apparatus 310 and apparatus 320 may perform various functions to implement schemes, techniques, processes and methods described herein pertaining to timing advance validation for transmission in preconfigured uplink resources in NB-IoT, including various schemes described above as well as process 400 described below.

Each of apparatus 310 and apparatus 320 may be a part of an electronic apparatus, which may be a UE such as a portable or mobile apparatus, a wearable apparatus, a wireless communication apparatus or a computing apparatus. For instance, each of apparatus 310 and apparatus 320 may be implemented in a smartphone, a smartwatch, a personal digital assistant, a digital camera, or a computing equipment such as a tablet computer, a laptop computer or a notebook computer. Each of apparatus 310 and apparatus 320 may also be a part of a machine type apparatus, which may be an IoT or NB-IoT apparatus such as an immobile or a stationary apparatus, a home apparatus, a wire communication apparatus or a computing apparatus. For instance, each of apparatus 310 and apparatus 320 may be implemented in a smart thermostat, a smart fridge, a smart door lock, a wireless speaker or a home control center. Alternatively, each of apparatus 310 and apparatus 320 may be implemented in the form of one or more integrated-circuit (IC) chips such as, for example and without limitation, one or more single-core processors, one or more multi-core processors, or one or more complex-instruction-set-computing (CISC) processors. Each of apparatus 310 and apparatus 320 may include at least some of those components shown in FIG. 3 such as a processor 312 and a processor 322, respectively. Each of apparatus 310 and apparatus 320 may further include one or more other components not pertinent to the proposed scheme of the present disclosure (e.g., internal power supply, display device and/or user interface device), and, thus, such component(s) of each of apparatus 310 and apparatus 320 are neither shown in FIG. 3 nor described below in the interest of simplicity and brevity.

In some implementations, at least one of apparatus 310 and apparatus 320 may be a part of an electronic apparatus, which may be a network node or base station (e.g., eNB, gNB or TRP), a small cell, a router or a gateway. For instance, at least one of apparatus 310 and apparatus 320 may be implemented in an eNodeB in an LTE, LTE-Advanced or LTE-Advanced Pro network or in a gNB in a 5G, NR, IoT or NB-IoT network. Alternatively, at least one of apparatus 310 and apparatus 320 may be implemented in the form of one or more IC chips such as, for example and without limitation, one or more single-core processors, one or more multi-core processors, or one or more CISC processors.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including timing advance validation for transmission in preconfigured uplink resources in NB-IoT in accordance with various implementations of the present disclosure.

In some implementations, apparatus 310 may also include a transceiver 316, as a communication device, coupled to processor 312 and capable of wirelessly transmitting and receiving data. In some implementations, apparatus 310 may further include a memory 314 coupled to processor 312 and capable of being accessed by processor 312 and storing data therein. In some implementations, apparatus 320 may also include a transceiver 326, as a communication device, coupled to processor 322 and capable of wirelessly transmitting and receiving data. In some implementations, apparatus 320 may further include a memory 324 coupled to processor 322 and capable of being accessed by processor 322 and storing data therein. Accordingly, apparatus 310 and apparatus 320 may wirelessly communicate with each other via transceiver 316 and transceiver 326, respectively.

To aid better understanding, the following description of the operations, functionalities and capabilities of each of apparatus 310 and apparatus 320 is provided in the context of a NB-IoT communication environment in which apparatus 310 is implemented in or as a wireless communication device, a communication apparatus or a UE and apparatus 320 is implemented in or as a network node (e.g., base station 125) connected or otherwise communicatively coupled to a wireless network (e.g., wireless network 120).

In one aspect of timing advance validation for transmission in preconfigured uplink resources in NB-IoT in accordance with the present disclosure, processor 312 of apparatus 310 as a UE, in a first mode, may receive, via transceiver 316, a configuration of a plurality of different values for a time alignment timer (TAT) from a network (e.g., wireless network 120 via apparatus 320 as a base station) before entering a second mode from the first mode. The first mode may be a radio resource control (RRC) connected mode, and the second mode may be an RRC idle mode or an RRC suspend mode. Additionally, processor 312 may perform certain operations when apparatus 310 is in the second mode. For instance, processor 312 may select one of the plurality of values to apply to the TAT and start the TAT to count. Moreover, processor 312 may perform, via transceiver 316, an uplink (UL) transmission to the network (e.g., via apparatus 320).

For instance, processor 312 may determine a validity of a timing advance (TA) value in a TA command received from the network before entering the second mode. In response to the TA value being determined as valid, processor 312 may perform, via transceiver 316, an early data transmission (EDT) to the network using preconfigured UL resources. In some implementations, in performing the EDT to the network, processor 312 may also determine whether apparatus 310 is in a same serving cell as that when apparatus 310 was in the first mode. In response to apparatus 310 being determined to be in the same serving cell in addition to the TA value being determined as valid, processor 312 may perform, via transceiver 316, the EDT to the network. In some implementations, in determining the validity of the TA value, processor 312 may determine the TA value to be valid in an event that the TAT has not expired and determine the TA value to be invalid in an event that the TAT has expired. In some implementations, processor 312 may also determine that there is data for UL transmission and initiate, via transceiver 316, a random access channel (RACH) preamble transmission for UL timing alignment in response to the TAT having expired.

Alternatively, processor 312 may determine whether apparatus 310 is in a same serving cell as that when apparatus 310 was in the first mode. In response to apparatus 310 being determined to be in the same serving cell, processor 312 may perform, via transceiver 316, an EDT to the network using preconfigured UL resources. In some implementations, in performing the EDT to the network, processor 312 may also determine the validity of the TA value in the TA command received from the network before entering the second mode. In response to the TA value being determined as valid in addition to apparatus 310 being determined to be in the same serving cell, processor 312 may perform, via transceiver 316, the EDT to the network. In some implementations, in determining the validity of the TA value, processor 312 may determine the TA value to be valid in an event that the TAT has not expired and determine the TA value to be invalid in an event that the TAT has expired. In some implementations, processor 312 may determine that there is data for UL transmission and initiate, via transceiver 316, a RACH preamble transmission for UL timing alignment in response to the TAT having expired.

Illustrative Processes

Figure 4:
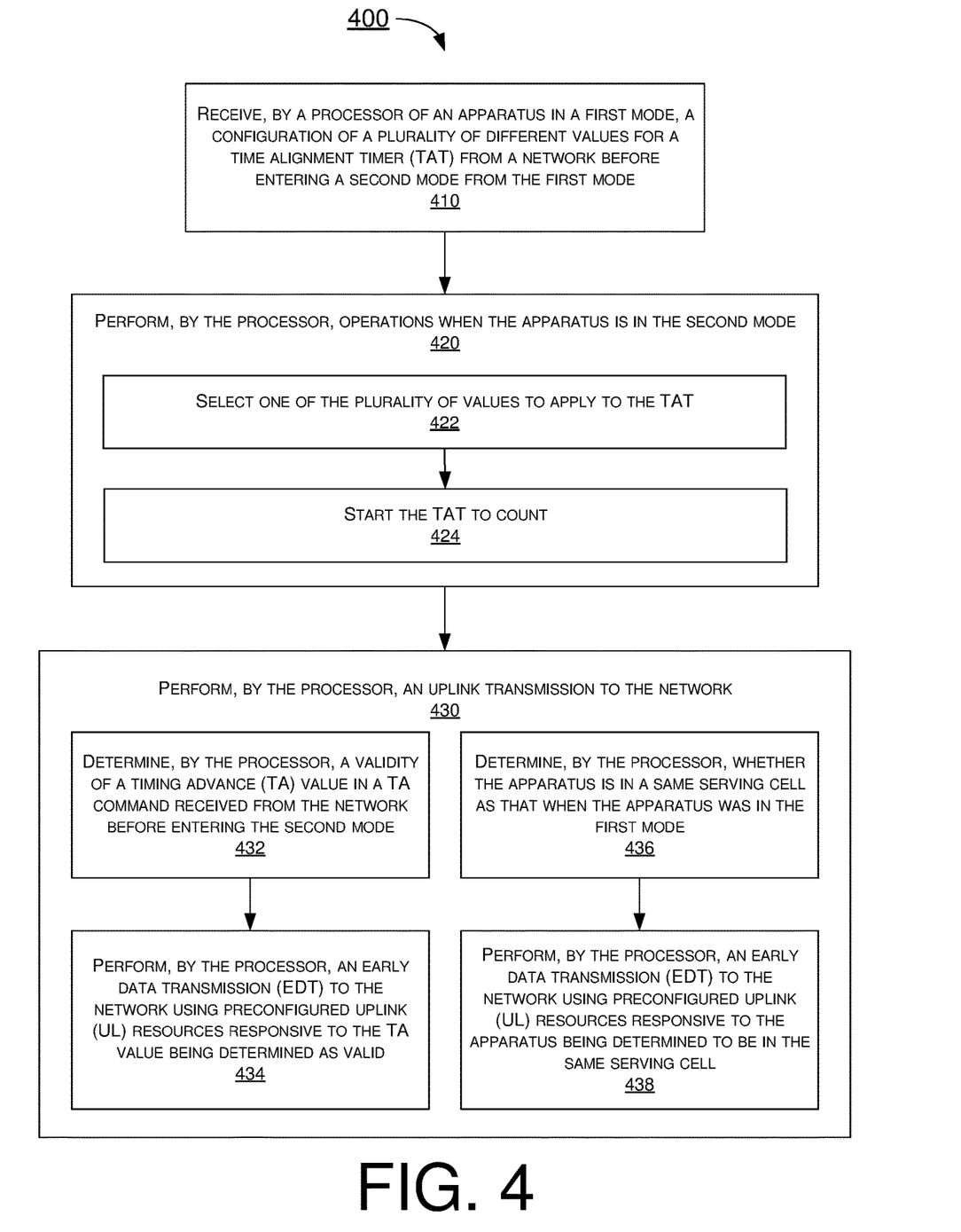
FIG. 4 is a flowchart of an example process in accordance with an implementation of the present disclosure.

FIG. 4 illustrates an example process 400 in accordance with an implementation of the present disclosure. Process 400 may be an example implementation of the proposed schemes described above with respect to timing advance validation for transmission in preconfigured uplink resources in NB-IoT in accordance with the present disclosure. Process 400 may represent an aspect of implementation of features of apparatus 310 and apparatus 320. Process 400 may include one or more operations, actions, or functions as illustrated by one or more of blocks 410, 420 and 430 as well as sub-blocks 422, 424, 432, 434, 436 and 438. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 310, apparatus 320 and/or any suitable wireless communication device, UE, base station or machine type devices. Solely for illustrative purposes and without limitation, process 400 is described below in the context of apparatus 310 as a UE (e.g., UE 110) and apparatus 320 as a network node (e.g., base station 125) of a wireless network (e.g., wireless network 120). Process 400 may begin at block 410.

At 410, process 400 may involve processor 312 of apparatus 310 as a UE, in a first mode, receiving, via transceiver 316, a configuration of a plurality of different values for a time alignment timer (TAT) from a network (e.g., wireless network 120 via apparatus 320 as a base station) before entering a second mode from the first mode. Process 400 may proceed from 410 to 420.

At 420, process 400 may involve processor 312 performing certain operations when apparatus 310 is in the second mode, as represented by 422 and 424.

At 422, process 400 may involve processor 312 selecting one of the plurality of values to apply to the TAT. Process 400 may proceed from 422 to 424.

At 424, process 400 may involve processor 312 starting the TAT to count. Process 400 may proceed from 420 to 430.

At 430, process 400 may involve processor 312 performing, via transceiver 316, an uplink (UL) transmission to the network (e.g., via apparatus 320), as represented by 432, 434, 436 and 438.

At 432, process 400 may involve processor 312 determining a validity of a timing advance (TA) value in a TA command received from the network before entering the second mode. Process 400 may proceed from 432 to 434.

At 434, process 400 may involve processor 312 performing, via transceiver 316, an early data transmission (EDT) to the network using preconfigured UL resources in response to the TA value being determined as valid. In some implementations, in performing the EDT to the network, process 400 may involve processor 312 determining whether apparatus 310 is in a same serving cell as that when apparatus 310 was in the first mode. Moreover, process 400 may involve processor 312 performing, via transceiver 316, the EDT to the network in response to the TA value being determined as valid and apparatus 310 being determined to be in the same serving cell. In some implementations, in determining the validity of the TA value, process 400 may involve processor 312 determining the TA value to be valid in an event that the TAT has not expired and determining the TA value to be invalid in an event that the TAT has expired. In some implementations, process 400 may further involve processor 312 determining that there is data for UL transmission and initiating, via transceiver 316, a random access channel (RACH) preamble transmission for UL timing alignment in response to the TAT having expired.

At 436, process 400 may involve processor 312 determining whether apparatus 310 is in a same serving cell as that when apparatus 310 was in the first mode. Process 400 may proceed from 436 to 438.

At 438, process 400 may involve processor 312 performing, via transceiver 316, an EDT to the network using preconfigured UL resources in response to apparatus 310 being determined to be in the same serving cell. In some implementations, in performing the EDT to the network, process 400 may involve processor 312 determining the validity of the TA value in the TA command received from the network before entering the second mode. Moreover, process 400 may involve processor 312 performing, via transceiver 316, the EDT to the network in response to the TA value being determined as valid and apparatus 310 being determined to be in the same serving cell. In some implementations, in determining the validity of the TA value, process 400 may involve processor 312 determining the TA value to be valid in an event that the TAT has not expired and determining the TA value to be invalid in an event that the TAT has expired. In some implementations, process 400 may involve processor 312 determining that there is data for UL transmission and initiating, via transceiver 316, a RACH preamble transmission for UL timing alignment in response to the TAT having expired.

In some implementations, the first mode may be a radio resource control (RRC) connected mode, and the second mode may be an RRC idle mode or an RRC suspend mode.

In some implementations, the configuration received from the network may be based on subscription-based UE differentiation information. Alternatively, the configuration may be based on a coverage class.

In some implementations, the configuration of the plurality of different values for the TAT is indicated by an RRC common signaling on a System Information Block (SIB) (e.g., SIB Type 2, or SIB2). Alternatively, the configuration of the plurality of different values for the TAT is indicated by an RRC dedicated signaling on a SIB (e.g., SIB2).

In some implementations, the plurality of values for the TAT may be stored in memory 314 of apparatus 310 and/or in apparatus 320 as a base station.

In some implementations, process 400 may involve processor 312 keeping a latest TA value with the TAT counting when apparatus 310 leaves the RRC connected mode to enter either the RRC idle mode or RRC suspend mode.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving, by a processor of an apparatus in a first mode, a configuration of a plurality of different values for a time alignment timer (TAT) from a network before entering a second mode from the first mode; and
    when the apparatus is in the second mode, performing, by the processor, operations comprising:
        selecting one of the plurality of values to apply to the TAT;
        starting the TAT to count; and
        responsive to the TAT having not expired, performing an early data transmission (EDT) to the network by skipping a Message 1 and a Message 2 in an EDT random access procedure to directly transmit data in a Message 3 to the network node.

2. The method of claim 1, wherein the performing of the EDT comprises:
    determining, by the processor, a validity of a timing advance (TA) value in a TA command received from the network before entering the second mode; and
    performing, by the processor, the EDT to the network using preconfigured uplink (UL) resources responsive to the TA value being determined as valid.

3. The method of claim 2, wherein the performing of the EDT to the network further comprises:
  determining whether the apparatus is in a same serving cell as that when the apparatus was in the first mode; and
  performing the EDT to the network responsive to the TA value being determined as valid and the apparatus being determined to be in the same serving cell.

4. The method of claim 2, wherein the determining of the validity of the TA value comprises:
  determining the TA value to be valid in an event that the TAT has not expired; and
  determining the TA value to be invalid in an event that the TAT has expired.

5. The method of claim 4, further comprising:
  determining, by the processor, that there is data for UL transmission; and
  initiating, by the processor, a random access channel (RACH) preamble transmission for UL timing alignment responsive to the TAT having expired.

6. The method of claim 1, wherein the performing of the EDT comprises:
  determining, by the processor, whether the apparatus is in a same serving cell as that when the apparatus was in the first mode; and
  performing, by the processor, the EDT to the network using preconfigured uplink (UL) resources responsive to the apparatus being determined to be in the same serving cell.

7. The method of claim 6, wherein the performing of the EDT to the network further comprises:
  determining a validity of a timing advance (TA) value in a TA command received from the network before entering the second mode; and
  performing the EDT to the network responsive to the TA value being determined as valid and the apparatus being determined to be in the same serving cell.

8. The method of claim 7, wherein the determining of the validity of the TA value comprises:
  determining the TA value to be valid in an event that the TAT has not expired; and
  determining the TA value to be invalid in an event that the TAT has expired.

9. The method of claim 8, further comprising:
  determining, by the processor, that there is data for UL transmission; and
  initiating, by the processor, a random access channel (RACH) preamble transmission for UL timing alignment responsive to the TAT having expired.

10. The method of claim 1, wherein the first mode comprises a radio resource control (RRC) connected mode, and wherein the second mode comprises an RRC idle mode or an RRC suspend mode.

11. An apparatus, comprising:
  a communication device configured to wirelessly communicate with a network; and
  a processor coupled to the communication device and configured to perform operations comprising:
    receiving, via the communication device when the apparatus is in a first mode, a configuration of a plurality of different values for a time alignment timer (TAT) from the network before entering a second mode from the first mode; and
    when the apparatus is in the second mode, performing operations comprising:
      selecting one of the plurality of values to apply to the TAT;
      starting the TAT to count; and
      responsive to the TAT having not expired, performing, via the communication device, an early data transmission (EDT) to the network by skipping a Message 1 and a Message 2 in an EDT random access procedure to directly transmit data in a Message 3 to the network node.

12. The apparatus of claim 11, wherein, in performing the EDT, the processor is configured to perform operations comprising:
  determining a validity of a timing advance (TA) value in a TA command received from the network before entering the second mode; and
  performing, via the communication device, the EDT to the network using preconfigured uplink (UL) resources responsive to the TA value being determined as valid.

13. The apparatus of claim 12, wherein, in performing the EDT to the network, the processor is further configured to perform operations comprising:
  determining whether the apparatus is in a same serving cell as that when the apparatus was in the first mode; and
  performing the EDT to the network responsive to the TA value being determined as valid and the apparatus being determined to be in the same serving cell.

14. The apparatus of claim 12, wherein, in determining the validity of the TA value, the processor is configured to perform operations comprising:
  determining the TA value to be valid in an event that the TAT has not expired; and
  determining the TA value to be invalid in an event that the TAT has expired.

15. The apparatus of claim 14, wherein the processor is further configured to perform operations comprising:
  determining that there is data for UL transmission; and
  initiating, via the communication device, a random access channel (RACH) preamble transmission for UL timing alignment responsive to the TAT having expired.

16. The apparatus of claim 11, wherein, in performing the EDT, the processor is configured to perform operations comprising:
  determining whether the apparatus is in a same serving cell as that when the apparatus was in the first mode; and
  performing, via the communication device, the EDT to the network using preconfigured uplink (UL) resources responsive to the apparatus being determined to be in the same serving cell.

17. The apparatus of claim 16, wherein, in performing the EDT to the network, the processor is further configured to perform operations comprising:
  determining a validity of a timing advance (TA) value in a TA command received from the network before entering the second mode; and
  performing the EDT to the network responsive to the TA value being determined as valid and the apparatus being determined to be in the same serving cell.

18. The apparatus of claim 17, wherein, in determining the validity of the TA value, the processor is configured to perform operations comprising:
  determining the TA value to be valid in an event that the TAT has not expired; and
  determining the TA value to be invalid in an event that the TAT has expired.

19. The apparatus of claim 18, wherein the processor is further configured to perform operations comprising:
  determining that there is data for UL transmission; and initiating, via the communication device, a random access channel (RACH) preamble transmission for UL timing alignment responsive to the TAT having expired.

20. The apparatus of claim 11, wherein the first mode comprises a radio resource control (RRC) connected mode, and wherein the second mode comprises an RRC idle mode or an RRC suspend mode.

* * * * *